United States Patent
Sephton

(10) Patent No.: US 6,309,513 B1
(45) Date of Patent: Oct. 30, 2001

(54) DESALINATION OF SEAWATER BY EVAPORATION IN A MULTI-STACK ARRAY OF VERTICAL TUBE BUNDLES, WITH WASTE HEAT

(76) Inventor: Hugo H Sephton, 120 York Ave., Kensington, CA (US) 94708

( * ) Notice: Subject to any disclaimer, the term of this patent is extended or adjusted under 35 U.S.C. 154(b) by 0 days.

(21) Appl. No.: 09/184,663

(22) Filed: Nov. 2, 1998

Related U.S. Application Data

(60) Division of application No. 08/726,126, filed on Oct. 4, 1996, now Pat. No. 5,853,549, which is a continuation-in-part of application No. 08/405,170, filed on Mar. 14, 1995, now abandoned.

(51) Int. Cl.[7] ................................. B01D 3/10; C02F 1/16
(52) U.S. Cl. .......................... 202/155; 159/18; 159/27.1; 159/27.4; 159/43.1; 159/DIG. 16; 202/205; 202/172; 202/173
(58) Field of Search ..................... 202/172, 173, 202/155, 236, 205, 242; 203/10, 71; 159/27.1, 27.4, 49, 13.2–13.3, DIG. 8, 43.1, 16.3, 18, DIG. 16

(56) References Cited

U.S. PATENT DOCUMENTS

| | | | |
|---|---|---|---|
| 4,217,176 | * | 8/1980 | Antony ................................. 202/173 |
| 4,511,436 | * | 4/1985 | el Din Nasser ...................... 202/174 |
| 4,810,327 | * | 3/1989 | Norrmén ............................. 159/13.3 |
| 5,156,706 | * | 10/1992 | Sephton ............................. 159/27.4 |
| 5,246,541 | * | 9/1993 | Ryham .................................... 159/49 |
| 5,853,549 | * | 12/1998 | Sephton .......................... 159/DIG. 8 |
| 5,944,950 | * | 8/1999 | Olausson et al. ....................... 159/49 |

\* cited by examiner

Primary Examiner—Virginia Manoharan

(57) ABSTRACT

A large and economical type of multi-stack vertical tube evaporator (MS-VTE) is disclosed having units of multiple stacks of vertical tube bundles or stages mounted in a single vessel, and having its liquid feed pumped to the uppermost VTE bundle stack or stage and having the feed then cascading downward through the lower bundle stacks in series flow, and wherein all the tube bundles are heated with the same waste steam of no or low $-value, e.g. with turbine reject steam in parallel flow under vacuum into the steam-sides of all tube bundles in the unit through a common steam conduit; and wherein the feed liquid is progressively evaporated from stage to stage or stack to stack and the vapors produced in the tubes of each bundle during the partial evaporation of the feed are separated between the stacks and condensed by parallel flow into one or more condensers. Applied to seawater desalination in a co-generation procedure with a coastal power plant, this evaporator produces about one pound of distilled water per pound of turbine reject steam used under vacuum and applied to single-effect mode in one evaporator unit or several units mounted in a single vessel with a condenser, to substantially reduce the cost of such useful distilled water. When applied in a similar cogeneration procedure but in a multi-effect series mode of several such units, or multiple units, the rate of distilled water production can be increased several-fold based on the amount of turbine reject steam applied.

10 Claims, 4 Drawing Sheets

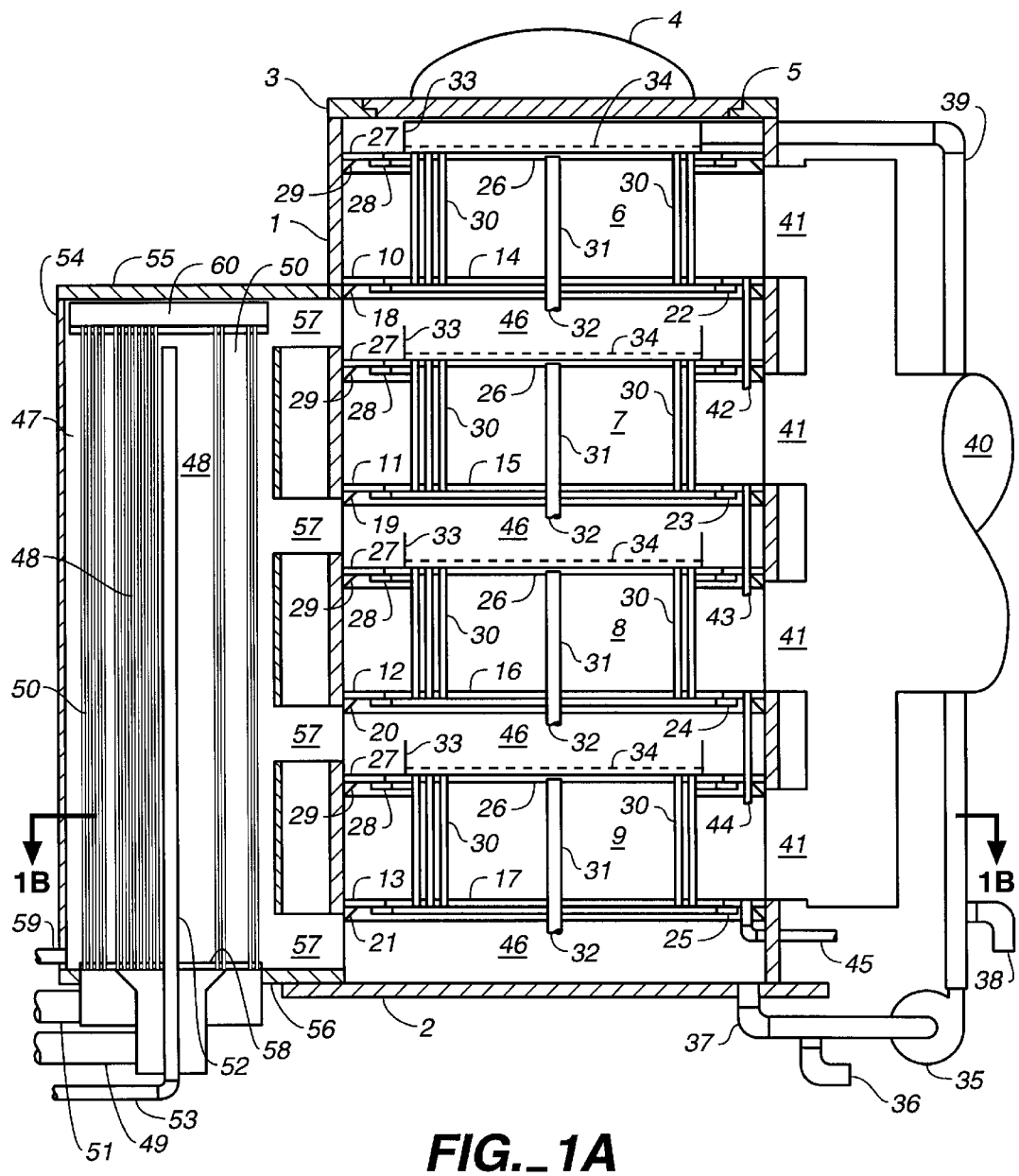
FIG._1A

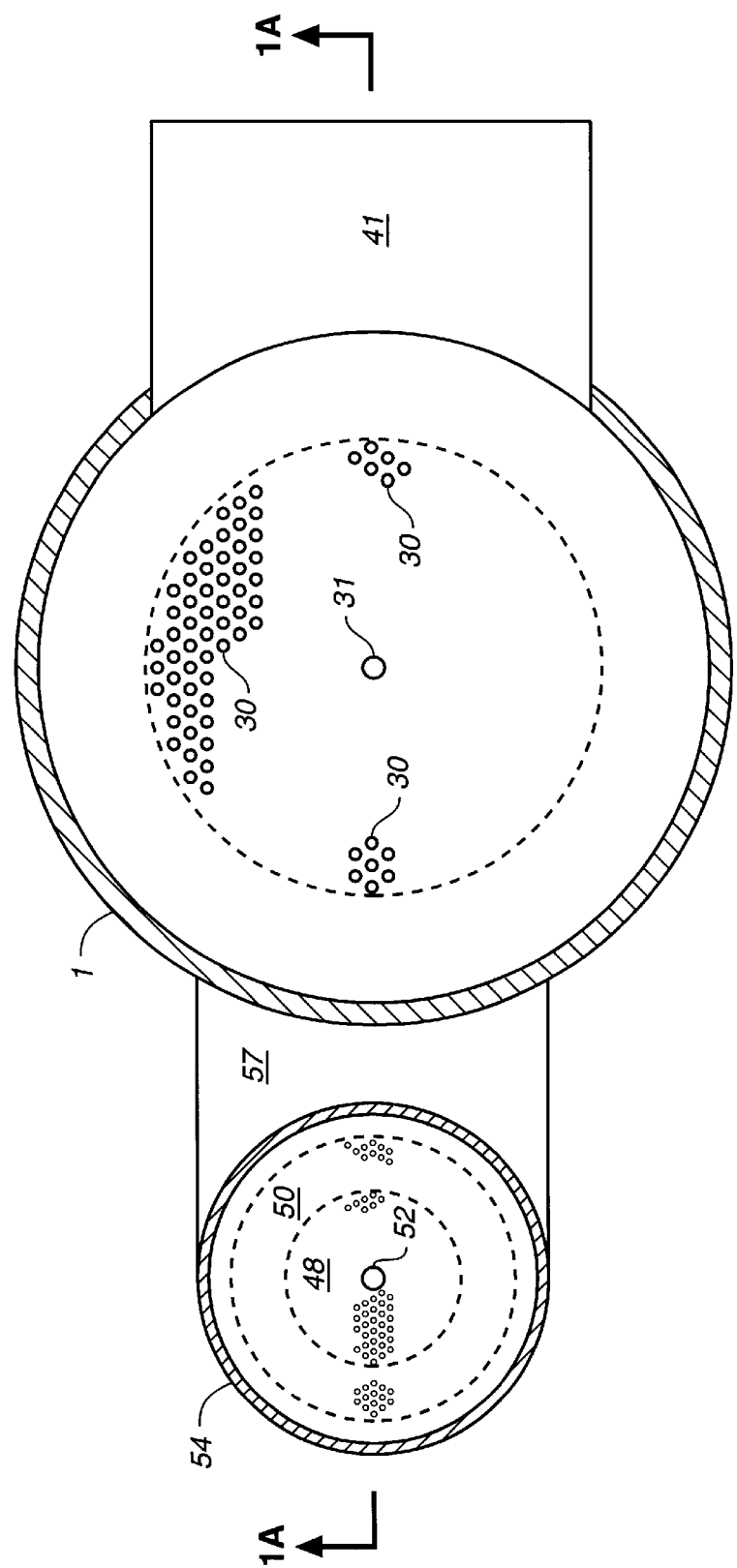
FIG._1B

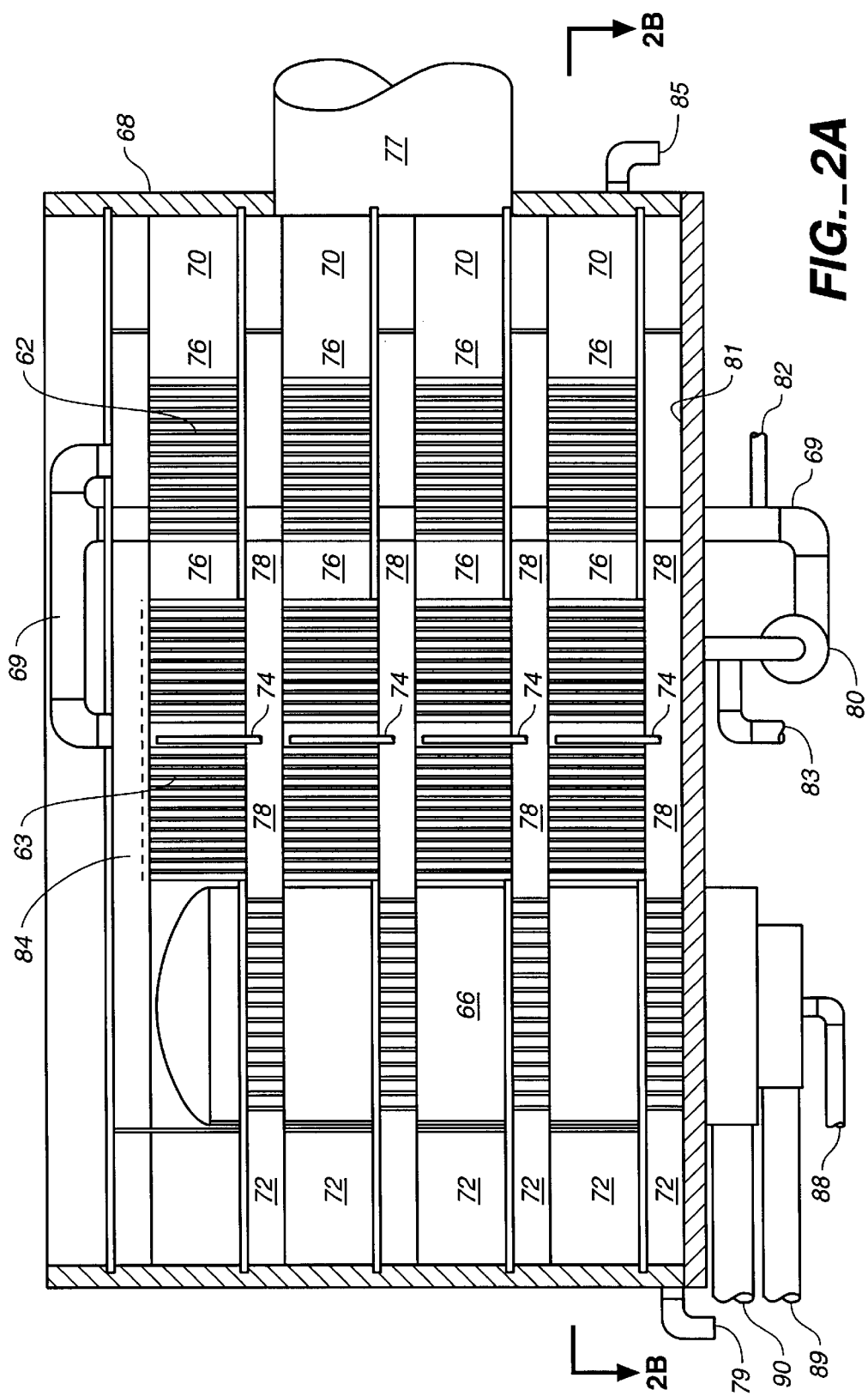

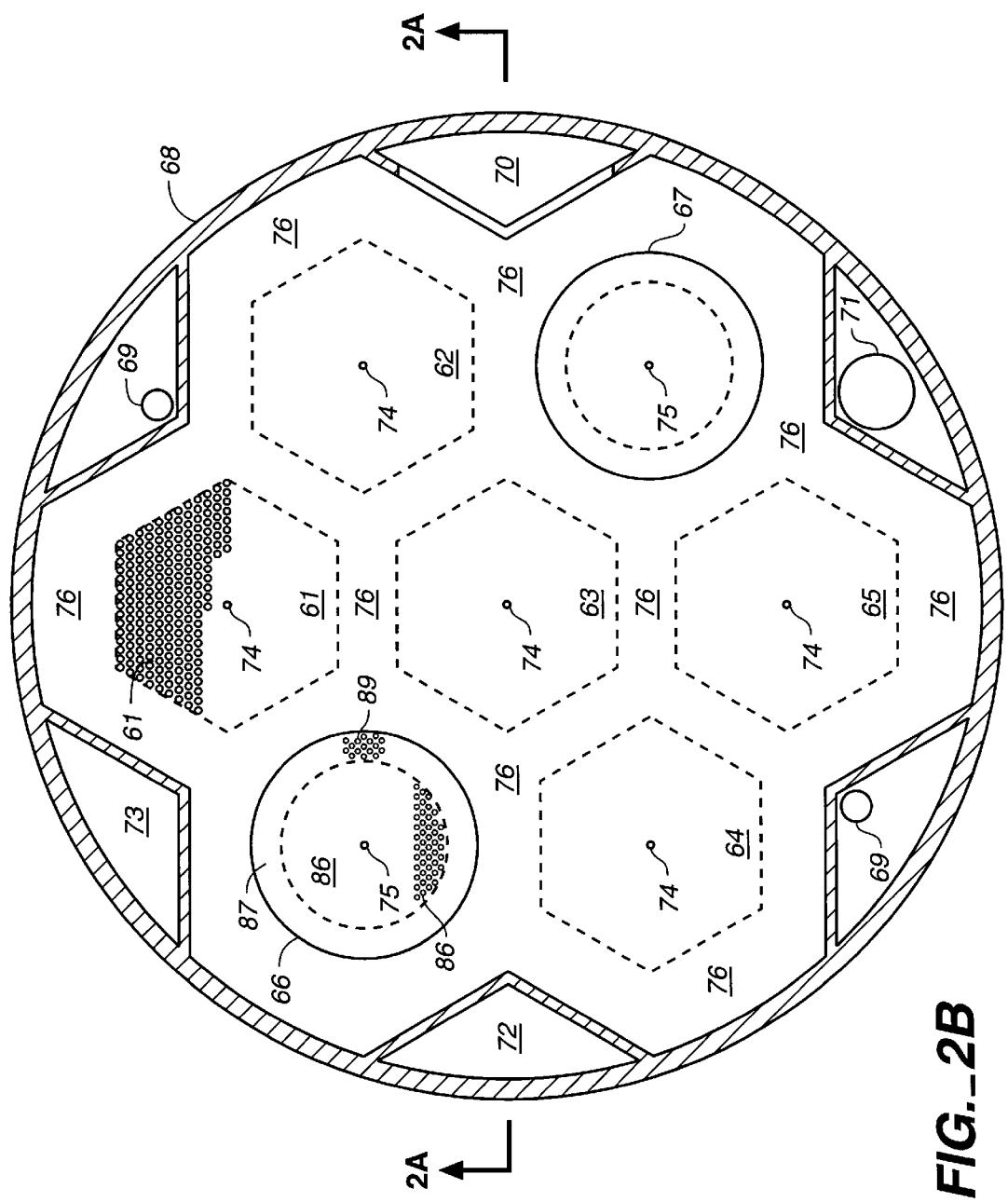
FIG._2B

DESALINATION OF SEAWATER BY EVAPORATION IN A MULTI-STACK ARRAY OF VERTICAL TUBE BUNDLES, WITH WASTE HEAT

This application is a division of my application Ser. No. 08/726,126 filed Oct. 4, 1996 and now U.S. Pat. No. 5,853,549 which was a Continuation In Part (CIP) of U.S. patent application Ser. No. 08/405,170 filed Mar. 14, 1995, now abandoned. This specification is mainly about single-effect evaporation and by using waste heat or turbine reject steam.

BACKGROUND OF THE INVENTION

(1) Field of the Invention

This invention relates to and is applicable to the desalination of seawater, brackish waters, industrial wastewater, municipal wastewater and, in general salty or saline water, or mining wastewater, by applying vertical tube evaporation or distillation.

(2) Description of the Prior Art

Known prior art related to this specification is described in the above U.S. Pat. No. 5,968,312 and in my U.S. Pat. No. 5,156,706 dated Oct. 20, 1992.

The U.S. Pat. No. 5,968,312 is about feed flow control and its distribution into a multiplicity of parallel vertical flash-down channels and into the tubes of a multi-effect series of evaporators arranged in a vertical array of such effects for seawater desalination or liquid evaporation, and by utilizing steam under pressure at an elevated temperature. Feed flow control and its distribution are provided for with adjustable orifice plates mounted horizontally and spaced above the inlet ends of a multiplicity of tubes in each of the tube bundles. Similar orifice plates are also applied therein to control flash-down of distillates, effect to effect to lower temperatures or pressure. The CIP application also references a Preliminary Design Report Number 1084 issued by the Metropolitan Water District of Southern California about a 30-effect vertical tube evaporator design which does not apply adjustable orifice plates or adjustable orifices but mentions fixed orifices drilled through distribution feed plates mounted above the inlet ends of vertical evaporator tube bundles. Each of those effect levels as well as the vertical tube bundles of the prior art designs operate at different steam and brine temperatures, i.e. by multi-effect mode, and at different Delta-T's that vary by typically about 3 to 5° F. effect to effect. The reason for using such low Delta-T's per effect is to economize the high cost of the steam used at 233° F. or 22 psi. However, low Delta-T's impose high capital costs per effect as well as an increase in the product water cost. The present invention eliminates the high cost of steam under pressure which typically contributes about 40% of the cost of water obtained by multi-effect evaporation. The present invention also provides cost savings based on the effective use of waste steam under a vacuum which overcomes the small Delta-T limitations imposed by high cost steam which increases the heat transfer surfaces needed and its associated higher capital cost; and this invention also reduces the complexity of those facilities and the cost of pure water produced by desalination. The present invention is based on a new path of steam flow by using large, stacked tube bundles, and also of vapor flow out of such bundles. In addition, it provides means for increasing and improving evaporator design options, especially the need to minimize or to control parasitic pressure losses in steam and vapor flow channels for and inside evaporators.

In U.S. Pat. No. 5,156,706 of 1992, single-effect waste-heat evaporators are disclosed having conventional tube bundles that are individually enclosed in shells, not stacked or staged, and the feed is recycled through such single tube bundles with a pump and is not cascaded from one tube bundle to another below it which distinguishes it from this case. This reference is also about the use of a monomolecular dispersant additive to control fooling and scaling of heat transfer surfaces during brine concentration with evaporators and about maintaining online operation for prolonged periods of time. It was aimed at the wastewater produced in power plants, typically at 50,000 to 500,000 gallons per day or GPD rates. The present target is what to do about waste heat, and the problem is that conventional evaporators have too small a capacity to handle it and cannot be scaled up by making their tube bundles taller or fatter, because both would reduce their efficiency unacceptably.

The present invention is direct to large capacity units, and to the control of steam-side and brine-side pressure drop to improve the thermal efficiency and to reduce the capital cost of desalination with large evaporation plants to a level lower than that obtainable by any other desalination procedure; and it is also distinguished from those procedures.

Waste heat for evaporation is available at a low temperature, in the range of about 100 to 120° F. as turbine reflect steam under a vacuum, and this heat is usually rejected to a coolant passed through a condenser maintained under vacuum. This type of steam has no $-value on the bams that no further power can be generated with it in the turbine; it flows as waste in thousands of tons per hour in large power plants. Such heat sources may now become useful due this invention of an evaporator which can handle and use large rates of flow of waste steam, has a highly enhanced efficiency of heat transfer as described below, and is capable of being a substitute for the conventional power plant condenser. Since this type of heat or waste heat has essentially no $-value, the most economical option of using it for evaporation would be to apply it in a single-effect mode which minimizes the capital cost of the evaporator by applying the entire temperature difference (Delta-T, or D-T) available between the steam and the heat sink or coolant in a single-effect mode. Such an evaporator is distinctly differentiated from both the conventional vapor compression type of evaporator which usually operates at high temperatures (typically at about 220° F.) as single-effect units with their vapor compressors being driven by electric motors, and also from the multi-effect evaporators which typically operate within the temperature range of about 220° F. and 120° F. In the latter, a step-wise series of effect temperatures are applied, to provide the beat or a reasonable economy based on the combination of the capital cost of the facility and the cost of the steam. The present invention is about a novel modular type of single-effect evaporator having a large unit capacity ranging from about 1 million gallons per day or MGD to 20 MGD, and wherein the concerns of control of steam and vapor pressure losses, and their efficient condensation, are of primary significance, especially when operating in single-effect mode at a low temperature but with the advantage of a relatively high Delta-T, this generates relatively higher steam and vapor mass flows due to this high Delta-T and the low temperature of operation in comparison to the above vapor compression and multi-effect units. Such an evaporator can either serve as the sole condenser for, or as one of several condensers for the steam being rejected from a turbine at low pressure or under vacuum. This type of evaporator-condenser can now be used to desalinate seawater at rates of about 20 MGD of distillate per 1000

MW steam turbine at coastal power plants, other wastewaters or brackish water sources may be desalinated or renovated for industrial or other uses at inland power plant locations, with this procedure.

SUMMARY

An objective of this invention is to provide an economical evaporation procedure for liquids, including seawater, by using waste steam applied in a single-effect heating mode to a vertically stacked array of vertical evaporator tube bundles wherein the liquid is progressively concentrated in stages while cascading from stack to stack through these tubes, and by condensing the vapors produced in a condenser to form distilled liquid.

A 100 MW steam turbine typically rejects about 350 Tons/Hr of steam under vacuum which then is condensed in a water or seawater cooled condenser. An evaporator designed according to this specification and operating between such a turbine and a condenser could produce about 2 million gallons per day (MGD) of desalinated water by utilizing this waste heat.

Alternatively, this evaporator and its condenser can be retrofitted to operate in parallel with an existing power plant condenser and by using a portion of the turbine reject steam.

This invention is mainly about the design and operational or process aspects of a large seawater desalination system utilizing power plant turbine reject steam under vacuum which has no $-value or a very low value, or another source of waste heat to drive the distillation process. One examples of this invention uses a vertical tube bundles designed to have an acceptably low steam-side pressure drop and brine-side vapor pressure drop, which depends on the selection of the tube length and diameter when operated at a low temperature in the range of typically 100 to 130° F. with a Delta-T in the range of typically 7 to 15° F., and wherein several such tube bundles are assembled into a vertical stack unit sufficient to produce a targeted capacity of say a 1 million gallons per day (1 MGD) per unit, and wherein evaporation occurs in vertical stages wherein brine concentration increases or progresses stage to stage but the heating steam is of essentially a constant temperature and pressure for all evaporation or concentration stages; and which unit can be further sealed up by the addition more stacked bundles, or by using two or more such multi-stack units mounted side-by-side (or vertically) to provide a facility of 2, or 5, or 20 MGD capacity. For example, modules or units having more than 2 such stacked multiple bundles may be assembled, and may be mounted side-by-side within a common pressure vessel to provide larger evaporation capacities if sufficient waste heat is available. This multiple unit of stacks of vertically mounted multi-tube evaporator bundles or stages provides for a large evaporator facility having cascading flow or down-flow of feed liquid through the vertical stacks of tube bundles at essentially a constant steam temperature but at increasing concentration or salinity through the evaporator bundles or evaporation stages, and with parallel flow of the steam or heating fluid at essentially a constant or equal temperature or steam-side pressure to drive the evaporation process. The most significant advantages of this approach is that the cost of the pure water product can be lower than from any other present day desalination procedure, based mainly on the improvements of using waste steam to drive this evaporation system at no or low energy cost, and on this design for the assembly of large-capacity facilities based on a novel use of modular units of tube bundles stacked vertically for single-effect operation in a single pressure (or vacuum) vessel which provides improvements in the capital cost, in the feed pumping cost and in the energy cost needed. Tube bundles can be shop fabricated at low cost for field assembly of units.

This technology of using previously useless waste steam is made feasible in part by the recent development of several improvements comprising means and methods of enhancing the coefficient of evaporative heat transfer, or the rates of heat exchange and evaporation, now well provides but not yet widely used, as well as a new means of feed distribution, and now the further improvements of this specification. Those heat transfer improvements are about the use of evaporation tubes having fluted wall surfaces which increase the smooth-tube steam-side condensing coefficient about 5-fold, and which herein is used in combination with the imposition of foamy vapor-liquid brine-side flow which improves the brine evaporation coefficient about 4- to 6-fold (Ref. U.S. Pat. No. 3,846,254 of 1974), as well as the more recent dispersed seeded slurry evaporation (DSSE) or dispersed slurry evaporation (DSE) method which controls scaling or fouling of the brine-sides and improves the on-line availability of such evaporators (Ref. U.S. Pat. No. 5,156,706 of 1992). Also, the prior art multi-effect evaporators usually limit the Delta-T per effect to 3 to 5° F. in order to justify or economize the high cost of steam under pressure, which in turn increases the capital cost as well as the product cost. The use of turbine reject steam or waste heat of this invention permits the application of the high Delta-T of such waste heat sources, which can be 15° F. or more, to further reduce the capital cost of this evaporator facility as well as the product water cost. This thermal performance is defined with the basic rule or formula for evaporative heat transfer:

$Q=U \times A \times DT$, or $Q=UAD\text{-}T$ wherein Q is the total heat flux in Btu/Hr and which is proportional to the evaporation rate, U is the overall heat transfer coefficient in Btu/hr-Ft$^2$-°F., A is the heat transfer surface are is square foot (Ft$^2$), and D-T is the Delta-T or temperature difference in °F. that drives the evaporation process. This overall heat transfer coefficient U has been measured as 1640 to 1760 Btu/r-Ft$^2$-°F. with steam condensing at 122° F. in a 200-tube bundle of double-fluted aluminum-brass tubes of 3-inch diameter and 10-foot long while evaporating seawater.

In addition, this invention provides for and improves the control of steam-side and brine-side pressure losses or pressure drops, and it reduces the costs of fabrication and assembly of much larger comparable evaporators than in prior art waste-heat evaporators, for improvements in using low temperatures evaporation of seawater of saline water by extracting and using heat from power turbine reject steam as the energy needed for evaporation. The cost of steam for seawater conversion by multi-effect distillation is thus eliminated by using some of the heat remaining in turbine reject steam now rejected to the environment. Secondly, since the temperature span or difference between turbine reject steam and seawater coolant can provide about 3-fold the typical available multi-effect Delta-T per effect, this permits a significant reduction is the evaporator tube surface needed by this single-effect evaporator to produce an equal volume of distilled water, thirdly since this evaporator can be placed between the power turbine and its condenser, the separate condenser usually required by an evaporator can be eliminated. In addition, the low temperature of operation of this invention reduces chemical feed treatment needs, and metal corrosion rates are reduced which permits the use of aluminum-brass and aluminum alloys for heat transfer tubes with confidence. The evaporator vessel for this invention may be fabricated from steel, or steel reinforced concrete.

The high or increased steam and vapor mass flows generated by the above increase in available waste heat Delta-T in combination with the above enhanced heat transfer rates can be controlled when utilized in this single-effect mode for very large seawater evaporators. The vertically stacked multi-tube bundle units of this design solves the problems of handling such high flow rates by minimizing or reducing pressure drop; this multi-stack design presents advantages of flow control by novel conduit design options for steam and vapor flow paths not manageable with the means of the prior art designs.

BRIEF DESCRIPTION OF THE DRAWINGS

FIGS. 1A and 1B represent an Elevation View and a Plan View respectively of a 4-stack tube bundle unit suitable for evaporation of above 1 MGD (million gallon/day) of seawater in single-effect mode, and its condenser.

FIGS. 2A and 2B represent an Elevation View and a Plan View respectively of an assembly of a single-effect facility having five evaporator units and two condenser units within a vertical cylindrical vessel or a concrete silo, suitable for distillate capacities in the range of up to about 20 MOD.

DESCRIPTION OF THE PREFERRED
EMBODIMENTS AND PREFERRED METHOD
OF OPERATIONS

In the preferred and simples embodiment, a 4-stack vertical tube evaporator unit having a distillate capacity of about 1 MGD is represented by FIGS. 1A and 1B, with four stacked multi-tube bundles wherein the tube length and tube diameter as well as the number of tubes in the bundles and the number of tube bundles in the stack as well as the Delta-T applied are selected to cause liquid evaporation or distillation at a stated or desired capacity under certain or required conditions of steam temperature and coolant temperature, and wherein all the tubes in those bundles or stacks of bundles are operated under essentially the same or constant steam-side or shell-side temperatures or with steam from the same source, e.g. turbine reject steam, and wherein the liquid or brine to be evaporated or distilled passes sequentially through the tubes of the stacked tube bundles in downflow as the liquid is partially evaporated, or concentrated. Also, the liquid-side or tube-side is maintained at a low pressure or a vacuum and causes the liquid to partially evaporate as it passes through the tubes while the steam condenses on the outside surfaces of those tubes. In one example of such a 4-stack unit of 1 MGD capacity, each bundle would contain about 1500 tubes of 3-inch diameter and 10-foot length if the available Delta-T is about 12° F. For a capacity of up to about 2 MGD one 8-stack evaporator unit may be mounted in a single vessel with its condenser, or two 4-stack units may be mounted side by side with a vertical condenser within a single vessel. This process also applies for, FIGS. 2A and 2B, which represents the preferred embodiment for a larger evaportion capacity of about 5 to 20 MGD, and wherein there are a multiplicity of stacks of tube bundle units similar to the one in FIGS. 1A and 1B, as shown with five units of four stacks each mounted side by side with two vertical condensers to achieve the larger capacity of evaporation or distillation. For a capacity of 20 MCD, the number of bundles per stack may be increased to 20 each for 5 evaporator units, or about 10 units having about eight tube bundle stacks each, and based on selecting the number, length and diameter of the tubes as above.

Referring now to the Elevation View of FIG. 1A, showing an evaporator vessel having a vertical cylindrical shell or wall 1, a base or floor or bottom plate 2 and a top cover plate 3 having as an option a removable central dome 4 sealed with a suitable gasket 5 to said cover plate 3; the central section of the cover plate or dome 4 is removable, to permit installation of a selected number of evaporator tube bundles with a crane through this open top area, and whereof four are shown as 6, 7, 8 and 9 inside the vessel as a stack or evaporator unit. The tube bundles may be supported on four annular flat plates 10, 11, 12 and 13 which may extend horizontally from the outer edge of the four lower or bottom tube sheets 14, 15, 16 and 17 to the inner surface of the vessel wall 1 and may be supported by said wall and sealed thereto e.g. with sealing ring supports 18, 19, 20 and 21 attached to said wall 1 shown as triangular rings in sections which may be bolted to the inner wall surfaces of the vessel wall 1 and at a selected vertical spacing between the tube bundles to allow adequate separation space of vapor and brine, e.g. about seven feet. Tube bundles may be supported on flat sealing rings 22, 23, 24 and 25 which may be bolted to the four annular flat plates with gasket seals; alternatively or in addition the tube bundles may be supported by any other suitable support means, e.g. support columns of concrete, aluminum or another material attached or bolted to the vessel floor 2 and to the outer edge of the bottom surface of the bottom tube sheet 17, and by similar support columns affixed or bolted to outer edges of the upper or top tube sheet 26 of a tube bundle such as 9 and the lower or bottom tube sheet 16 of a tube bundle 8 above it, and so on upward to support all bundles one above the other. The upper tube sheet 26 of each bundle may be supported by an annular plate 27 with a flat sealing ring 28, and the outer edge of this plate may be sealed against the vessel wall 1 with a triangular sealing ring support 29 for each tube bundle level. The evaporation tubes 30 of each bundle extend through the lower and upper tube sheets and are sealed into the tube sheets at both ends, and are horizontally spaced from one another, typically by about 0.75-inch in a triangular arrangement, and this array of tubes typically extend continuously over the circular area of the tube sheets as also indicated by a broken circle in the Plan View of FIG. 1B. The Elevation View of FIG. 1A does not show all tubes in a bundle, but only as a matter of convenience and to leave room for the item numbers. The actual tube to tube spacing is variable and optional as a subject of design to provide for a low steam pressure drop but adequate, continuous steam-side flow for maximal condensing efficiency. And the tube length is similarly variable and subject to design considerations, as is also the tube diameter. A suitable vent tube 31 of selected diameter may be located in the center of each tube bundle, each vent tube being closed at its top end, open at its bottom end 32, and its wall being perforated with a selected number of holes of a size designed to permit venting of a definite portion of the steam flow there-through and suitably spaced along the tube length to control an adequate rate of steam vented from and along the length of this central bundle area, and the vented steam may be released for example into the vapor area underneath each tube bundle. In operation, there would typically exist a higher pressure on the steam-side of all tube bundles than on their vapor-side by up to about 2 inches of mercury which is dependent on the Delta-T applied for evaporation of the liquid; a suitable valve or another adjustable flow reducer may be attached to the bottom end 32 of the vent pipe 31 to provide for the further control of the vapor vent rate. Sealed to the upper surface of the upper tube sheets of each tube bundle is shown an optional vertical cylindrical plate 33 to form a pool of liquid feed to be distributed into the vertical evaporation tubes 30 of each bundle. The distribution of liquid feed into the tubes 30 may be controlled by a suitable feed distributor or an orifice plate 34 to control the flow of feed liquid or liquid and vapor into the tubes, and this flow maybe controlled for example by means of the adjustable orifice plate as in my U.S. Pat. No. 5,968,312. The objective of the orifice plate is to distribute the feed liquid continuously and evenly into all the evaporator tubes and to also maintain a liquid level or a liquid pool above each tube bundle, and this pool may be contained by the vertical plates 33. Brine or another liquid may be recycled through the tubes of the stacked tube bundles by means of a pump 35, and with the addition of deserated food thereto at one location 36 in the recycled feed recovery pipe 37 which draws recycled feed from the base area of the lowest tube bundle 9 into the recycle pump 35 which then pressurizes the feed for the rejection of some concentrated blowdown at another location 38, and for delivery of feed brine to the top of the evaporator stack or unit and into the feed liquid pool of the top tube bundle 6 through the feed delivery pipe 39. A heating fluid such as waste heat or turbine reject steam under vacuum may enter or be drawn under vacuum into the multi stack evaporator unit from one side of the vessel as shown through a large steam conduit 40 which may be branched or divided into several parallel conduits 41 forming a plenum for the parallel delivery of mean flows or of another heating fluid into the shell-side of all the stacks of tube bundles mounted of vertically in the multi-stack evaporator unit. The steam condensate formed on the outside surfaces of all the evaporator tubes and drained onto the tube sheets 14, 15 and 16 may be collected by suitable open-ended pipes 42, 43 and 44 connecting the lower tube sheet extending annular plates 10, 11 and 12 to the upper tube sheet extending plates 27 (typical) of each tube bundle and passed through them to deliver these condensates onto the bottom tube sheet extender plate 13 of the lower tube bundle 9, from which all condensates from the stack of bundles are removed through a pipe 45 for return flow, to e.g. the power plant boiler or steam generator for reuse to produce steam under pressure to drive a power plant turbine.

The heat from steam condensation is thus delivered to all the outside tube surfaces of this single effect facility at essentially equal temperature and pressure, and this heat is utilized at the heat of evaporation of the brine or liquid passing as annular falling films of liquid and vapor through those tubes 30, and to partially vaporize those liquid films. The vapors thus provided in a bundle flow downward through the tubes with the residual brine or liquid and are separated below the tube bundles. The separated liquid or brine phase falls downward to collect in pools formed above the next tube bundle, e.g. pools bounded by the vertical cylindrical plate 33, and for distribution into the tubes of the next tube bundle stack below it and for further partial evaporation, while the vapor phase produced from all the tubes in a bundle or stack flows side-ways or horizontally or radially outward from the disengagement area 46 below the bundles. The liquid phase or brine concentrate from the lowest or bottom tube stack 9 collects in a pool on the floor 2 or base plate below the bottom stack and is removed by the pump 35 for recycle as discussed above. The vapor phase produced in each of the stacked bundles of tubes and separated from the liquid phase in the areas below the tubes 46 flow radially outward from these areas and then toward a condenser 47 for its condensation into distillate, and may be passed through mist elimination chevron vanes or a wire mesh screen or both to eliminate small droplets of liquid or brine entrained in the vapor phase before it reaches the condenser. These droplets collected on the vanes or wire mesh would drain into the liquid phase or brine pool for further evaporation.

The condenser 47 shown in FIGS. 1A and 1B on the left may be of a vertical tube two-pass type as shown or another suitable type, preferably, it may have condenser tubes of the outside-fluted type which provides for an enhanced steam-side or condensation coefficient. Two bundles or groups of condenser tubes as shown, wherein the inner tube bundle 48 is for upflow of coolant entering from the coolant inlet pipe 49, and an outer or annular tube bundle 50 which returns the coolant to the outlet pipe 51 to downflow. A vapor vent tube 52 is shown in the center of the upflow tube bundle 48 which is closed at its top and has perforations along its length at suitable locations and of diameters to assure sufficient venting of non-condensable gases or air from the central area of the condenser and which can be removed through the pipe 53, e.g. to a suitable vacuum pump to evacuate air from said vessel and to maintain the entire evaporator facility under an adequate vacuum during startup and operation. The condenser may be mounted inside a vessel common with the evaporator or it may be a separate vessel as shown having a cylindrical wall 54, a vacuum tight but removable top cover 55 and a base or bottom plate 56, and it may be connected to the evaporator by suitable connecting vapor ducts or conduits 57. Vapor produced in the evaporator condenses on the outside or vapor-side surfaces of the condenser tube bundles 48 and 50, and the condensate drains onto the lower tube sheet 58 and can be removed through a distillate pipe 59 with a pump. The space or area 60 above the upper tube sheet in the condenser provides for coolant turn around from upflow to downflow and for inspection or cleaning of the tubes when the cover 55 is removed.

The lower part or Plan View of FIG. 1B represents the evaporator and condenser tube bundles as a Section View 1B–1B as shown across the Elevation View of this FIG. 1A. Shown are the cylindrical evaporator well 1 and condenser wall 54, a vapor conduit 57, some of the evaporation tubes 30 which would extend over the entire circular area outlined by a broken circle, spaced in a triangular pattern of tube spacing, and also a central steam vent tube 31. Also an inner cylindrical condenser tube bundle 48 and center condenser tube bundle 50 within the circles of dashed lines and comprised of the tube bundles and a central vapor vent tube 52. Typically, the evaporator tubes are made of aluminum or aluminum-brass, and may be of 2 to 4-inches in diameter while the condenser tubes may be made of aluminum or naval-bronze and may be of 0.75 to 1-inch diameter. Only a few condenser tubes which extent within the broken lines, are shown.

This design of a vertically stacked single-effect unit composed of one evaporator effect and one condenser may also be applied in a multiple-effect arrangement of more than one of such single-effect units. This option can be useful in cases where increased water production has a value that exceeds the consideration is of added capital costa incurred, by providing for several evaporation effects to split of divide the Delta-T available for evaporation and cooling. The temperature Delta-T range of up to about 35 to 40° F. is typically available between the turbine exhaust steam temperature and the seawater coolant temperature of a power plant; this would then be split between two evaporation effects and a condenser. This could increase water production rate by a factor of two albeit an at an increased capital cost per gallon of product water. Alternatively, as an additional beneficial option, the power plant turbine may be operated at a slightly higher back-pressure, e.g. at 3.5 inches of mercury absolute rather than the more usual 2.5" Hg, which could provide a sufficient additional delta-T range to operate two or more effects with about the same delta-T per effect as before and without significant increase in the capital cost per gallon of water. Thus, a small loss in power production can be offset by a significant additional water production capacity which may have a higher value. On this basis, an increased flexibility in the economics of power and water production is this provided by this invention, and this provides an alternative and useful co-generation objective with this invention.

In addition, these effect-to-effect assemblies of stacked multiple tube bundle units may be mounted in a vertically stacked on a staggered or adjacent orientation to facilitate improved steam and vapor flow between the effects and the final vapor condenser, also, they may alternatively be mounted within the same pressure or vacuum vessel, and still be within the scope of this specification. The range of options, especially in co-generation of water and power may be even broader, for instance the Delta-T applied per effect may be increased during times of low power demands (off-peak), and the instance by increasing the coolant flow rate to produce extra water to be stored in a reservoir for later use.

Referring now to FIGS. 2A and 2B which represents a multiplicity of evaporation bundle stack units and condensers similar to those in FIGS. 1A and 1B, but mounted in a parallel array within a single pressure of vacuum vessel, for single-effect operation in larger capacity facilitates, for example to produce distillates i the range of 2 to 20 MGD and using turbine reject steam from power plants or other waste heat sources. Five vertical stacks of multiple tube bundle units 61, 62, 63, 64 and 65, and two condensers 66 and 67 are shown in the Plan View of FIG. 2B, and its Elevation View FIG. 2A represents two of the five vertical evaporation tube bundle stacks 62 and 63 and one condenser 66. These evaporator tube bundles are shown as hexagonal, but they may be round as in FIGS. 1A and 1B, or octagonal or square and still be within this specification. Also shows is a cylindrical vessel wall 68 or silo wall made of concrete having six vertical triangular concrete buttresses inside the vessel and forming vertical triangular shafts useful as conduits for materials, services and pipes, including two brine feed pipes 69 for the recycled brine, a steam conduit or channel 70 to supply turbine reject steam to all the steam-side levels of the facility, a feed deaeration channel wherein fresh feed or seawater feed may be cascaded downward in an evacuated cylindrical deaerator vessel 71, after acid addition to adjust its pH for the release of carbon dioxide, a vapor channel 72 for the transfer of the product vapors generated in all bundle stacks and for conveying the vapor into the vapor-side of the condensers 66 and 67 for its condensation into distillate, and a shaft 73 for elevators and personal access to man-ways at selected stack levels into all steam-side and vapor-side levels. Also shown are the vent pipes 74 centrally within the evaporator tube bundles and the vent pipes 75 centrally inside the condenser tube bundles. The FIG. 2B Plan View shown as a Section 2A—2A is taken at the lowest steam level at 2B—2B in FIG. 2A, and it shows a honeycomb of hexagonal steam conduits or lanes 76 that are all in communication with the steam channel 70 via large steam ports through the angle side wall of this steam channel at all evaporator tube steam-side levels for continuous and equal steam distribution and flow, and surrounding all the tube bundles in the first stack and all other stacks, to supply steam from the steam channel 70 to all the tube bundles at all stack levels via all steam lanes for all tubes to receive steam flow across them or essentially equal steam temperature and equal steam pressure.

The Elevation View of FIG. 2A shows the turbine reject steam supply conduit or pipe 77 connected to the vertical steam channel 70 which connects directly with the steam lanes 76 over the second and third stack levels, and this also provides steam for evaporation to all the tube bundles at all stack levels via the vertical steam channel 70 and the hexagonal steam lanes 76 at the tube level of all stacks, and wherein all the steam lanes provide a continuous steam conduit and receive steam at essentially equal steam pressure for parallel steam-side-operation of the tube bundles in all stacks. All the steam condensates from the tubes in one stack level are collected on the bottom tube sheets or extensions thereof and are drained onto the bottom tube sheet of the next stack downward, and all the steam-side condensates are removed through a drain pipe 85 from the bottom stack for return to the power plant boiler or steam generator. Only one vertical four-stack tube bundle assembly 63 is shown in cross section, with its central steam vent pipes 74 having open bottom ends located in the vapor release area below the tube bundle. These vapor release area 78 constitute continuous open spaces located below the lower tube sheets and above the upper tube sheets of adjacent stacks, and they also extend into the vapor-side or tube-side spaces of the condensers to permit essentially free flow of the vapor produced in any of the tube bundles into the condenser 66 and 67 for condensation into distillate. These vapor area 78 also extend into the vertical vapor channel 72 which provides a conduit for vapor flow and for vapor pressure equalization between all the stacks. The vapor product generated by evaporation of brine in the tubes, at a rate of about one pound of vapor per pound of steam condensed, is separated from the brine in this area 78 between the tube stacks and flows horizontally toward the condensers where it is condensed into product distillate which can be removed from the bottom tube sheet of the condensers with a pump through a distillate pipe 79. The concentrated liquid or brine is recycled with a pump 80 from the bottom plate or floor 81 of the vessel where it collects, and part of it is rejected through a blowdown pipe 82, to control the degree of liquid or brine concentration, while fresh feed, e.g., seawater from the deaerator 71, is added through another pipe 83 to maintain the volume of recycled liquid or brine and is mixed into this brine pumped into the brine recycle pipe 69 to the feed distribution area of each top level tube bundle stack. Here it is distributed about equally into all the vertical evaporator tubes of all the top bundles for flow as annular layers down the inner walls of those tubes, while it is partially evaporated by the heat supplied by steam condensation on the tube outside walls. Orifice plates 84, or the adjustable orifice plates of my U.S. Pat. No. 5,968,312 may be used for this distribution of liquid or brine flow, for any or all the evaporator tubes in all tube bundles and stack levels. The vertical cylindrical condenser 66 shown may be cooled with seawater in a two-pass, upflow tube bundle 86 and a downflow tube bundle 87, and having a central vertical vapor vent extraction tube 75 which extends the length of the tube bundle and being perforated with small holes along its length to vent a controlled fraction of the vapor through a pipe 88 to a vacuum pump, which also provides for the evacuation of all the air and gases from the vessel. Each condenser 66 is supplied with coolant inlet 89 and outlet 90 pipes. The condensers as well as all the stacks of multi-tube evaporator bundles may preferably be supported with suitable vertical columns or beams of concrete, aluminum or steel resting on or attached to the bottom plate or flour 81 of the vessels 68, with additional such columns attached to the upper and lower tube sheet outer edges to support the bundles on top of one another.

In this processor procedure, the vertically stacked tube bundles of this specification all operate at essentially the same temperature on all of their steam-sides and also at essentially the same brine-side temperatures but adjusted for boiling pint elevator of the brine, and these steam-to-brine temperature differences (or Delta-T's) can typically be in the range of about of 7 to 15° F., but the range may be wider depending on available heat or stream sources and coolants. A 4-stack bundle arrangement is shown in the drawings herein, and all operated as a single effect unit comprised of vertical stacks of multi-tube bundles wherein a single steam temperature and pressure is supplied to or applied to all tube steam-sides in all four stacks, and the brine-side temperatures are also essentially equal except for minor variations imposed by the boiling point elevation as the brine concentration increases stack to stack. However any useful number of tube bundles in a stack may be applied and also any useful number of tubes per stack, and the vertical condensers as shown may be horizontal and different from those shown herein, for instance they may be of the direct contact or barometric types or any condenser typically used for power plant cooling, and still fall within the scope of this disclosure. In addition, in circumstances where the amount of product wafer is to be increased albeit at an increased cost per gallon of such water, this design concept may also be utilized in a multi-effect combination or series of these multi-stack tube bundle units and still fall within the scope of this disclosure. In a multi-effect series of units, two or more of the multi-stack tube bundles of this disclosure as represented in FIG. 1A, FIG. 1B and FIG. 2A, FIG. 2B, may be operated in series and at different steam-side temperatures wherein turbine reject steam is condensed in the first effect and the vapor produced in the first effect is then condensed as heating steam in the second effect, and so on for more effects. Also, the heat transfer performance of the tubes used may be selectively improved, for instance by using shorter tubes having less pressure drop through them, using fluted-surfaced tubes with increased steam-side performance and using imposed foamy vapor-liquid flow inside the tubes for enhancement of the brine-side performance, and still fall within this specification. Additionally, the multi-effect series arrangements of single-effect multi-stack units may be placed in proximity to and connected by conduit means to one another, or horizontally adjacent one another within a common but partitioned vessel, or they may be mounted vertically one above the other or inside a common vertical vessel with suitable partitioning to provide for discrete effect pressures and temperatures as needed.

Another variable in the applications of this specification is for this evaporation facility or units thereof to operate in parallel to the power plant condenser rather than in series therewith as above. This may be the preferred option in the case of retrofitting this type of evaporate to a pre-existing power plant. In this case only a portion of the turbine reject steam may be utilized. Alternatively, all the reject steam may be drawn into the evaporator, and the vapor produced may then be condensed in the power plant condenser by suitable piping and valves, and the coolant flow rate may be increased to maintain the turbine reject steam pressure or the power plant heat rate at its original level.

Steam-side improvements

The vertical evaporator tube bundles of this invention may be conventionally round, i.e. rounded cylindrical tube assemblies sealed into and through top and bottom tube sheets or plates, or they may be octagonal, hexagonal on even square in circumference, the selection being based on advantages it provides, and to control or minimize steam-side pressure loss or temperature loss and to reduce capital one. Significant variables include the rate and temperature of reject steam flow available or applied; but the vital selections for this invention include the number of stacked units of tube bundles, the tube diameter and tube-to-tube spacing to assure advantageous steam-side flow and acceptable steam pressure drop, all being within the objectives of continuous and adequate steam flow without stagnation areas towards the axial bundle center where an adequate rate of vented steam may be withdrawn, for example through a perforated central steam vent, e.g. a pipe which may discharge this vent into the brine-side vapor space below each tube bundle where the vapor pressure is lower than the steam-side pressure. Nearly constant and continuous steam-side flow without stationary pockets is an objective of this disclosure, and also the prevention of stagnant steam-side eddies or localized eddies, these objectives are promoted or achieved by selecting a variable tube-to-tube spacing across the tube bundle and also the tube diameter and tube length, as well as the number of stacks selected.

Brine-side improvements

The tube diameter and its length affect the tube-side vapor pressure drop on the brine as it passes through the tube during its evaporation. This pressure drop is also directly related to the temperature of the brine during its passage through the tube, and also to that position of the available Delta-T which is then not available or utilized for evaporation. This invention allows for an increase in design options, e.g. the tube-side pressure drop may be reduced by selecting shorter tubes or wide tubes or more tube bundle stacks within the same effect, and increased evaporation is obtained by increasing the portion of the Delta-T utilized for evaporation, i.e. by reducing parasite losses due to pressure drop. Thus, by increasing the vertically stacked bundles from 4 to 5 while maintaining the same tube diameter and the same total cumulative tube lengths, or total tube area, and would reduce the tube-side presence drop through all tubes, now being shorter tubes, and improve the overall evaporation rate obtained with the facility, albeit at the cost of two additional tube sheets and support. Additional design flexibility of this invention which includes variable multiple stacks of evaporates tube bundles also permits a wider choice of tube diameters and lengths, whereby shorter tube lengths and larger tube diameters would reduce pressure drop and improve distillate production rates.

Other Improvements over the Prior Art:

The present invention simplifies and solves several other problems or concerns in the field of seawater evaporation. One is related to the high temperature (up to 230° F.) that the seawater feed has to be raised in before its multi-effect evaporation in a series of up to about 30 vertical downflow effects. This heating is best done is vertical bundles of aluminum tubes about a 50 Ft. long located centrally within the vertical series of 30 evaporator tube bundles, and with the feed flowing upwards under about a 700 Ft. head pressure (about 350 psi), while their steam-side pressures range from only about 24 psi to nearly full vacuum. Feed heater leakage could therefore be a serious problem and is one of the main concerns, especially considering that aluminum has not been used extensively in this service. In addition, the control of corrosion of aluminum in seawater evaporators at high temperatures or above 170° F., is still a matter of uncertainty and debate. The present specification solves or eliminates those problems or concerns, by doing any needed feed heating under vacuum and in a falling film mode of feed flow with steam or vapor under partial vacuum or at low pressure over the outside of these tubes, so that any tube leakage would be essentially harmless, and it would amount to a minor vapor or steam loss into the feed being heated. Omission of those fixed heaters from the tube bundles of this disclosure makes them comparatively simple in design and function. Feed heating can be done in the deaerator 71 and in the evaporator tubes of the top tube bundle 6 or 63.

In addition, wash steam temperatures are generally in the 100 to 130° F. range, and, in the optional multi-effect modes of operation with several of these multi-stack units in series mode as disclosed above, the turbine reject steam could range to about 160° F. which is within the range of well-demonstrated use of aluminum in seawater evaporation by multi-effect. For example, in the multi-effect series mole, turbine reject steam would condense in the multi-stack bundles of the first effect unit and the vapor thereby produced would condense as steam in the multi-effect stack unit of the second effect, and its vapor would condenser in either the tube stack of the next effect unit or in the condenser and so on. With such a 4-effect series of multi-stack units drawing the reject steam from a 100 MW turbine at about 160° F., about 8 MGD of distilled water may be produced. This amounts to about a four-fold increase in the distillation rate provided by the single-effect mode of operation, but the 160° F. reject steam has a potential value for power production at a turbine and this would increase the cost of the distillate somewhat if it is applied. The value of a kWh at the power plant site is presently quite low at about 2–3 cents/kWh while the value of descinated seawater is presently up to about $4/1000 gallon.

What is claimed is:

1. In an apparatus for single-effect vertical tube evaporation of liquids, the improvement comprising:

(a) A multiplicity of vertically stacked bundles of vertical tubes, said tubes being sealed at their ends through an upper tube sheet and a lower tube sheet and forming said tube bundles, (b) means for heating said tube bundles with waste heat or turbine reject steam comprising a common steam conduit interconnecting a steam-side of said multiplicity of vertically stacked bundles of tubes in parallel, (c) liquid distribution means interconnecting said multiplicity of vertically stacked bundles of tubes in series on their liquid-side, (d) vapor space vertically separating from one another said multiplicity of vertically stacked bundles of vertical tubes being mounted within a single vessel, (e) said vapor space being connected to condenser means for condensing said vapor to form distillate, and (f) said vessel having a top cover and a bottom plate, means for circulating a liquid from said bottom plate to the top cover of said vessel for distribution through said liquid distribution means, and means for evacuation of air from said vessel.

2. Apparatus as in claim 1 wherein said multiplicity of vertically stacked bundles of vertical tubes consists essentially of several units of said vertically stacked bundles of vertical tubes, and said units being connected one to another with conduit means for steam and vapor.

3. Apparatus as in claim 1 wherein said multiplicity of vertically stacked bundles of vertical tubes are supported by column means extending above said bottom plate of said vessel.

4. Apparatus as in claim 1 wherein said liquid distribution means comprise an adjustable orifice plate.

5. Apparatus as in claim 1 wherein said tubes are of a selected length.

6. Apparatus as in claim 1 wherein said tubes are of a selected diameter.

7. Apparatus as in claim 1 wherein said tubes are spaced from one another by a selected dimension.

8. Apparatus as in claim 1 wherein said tube bundles in said stack of tube bundles are of a selected member.

9. Apparatus as in claim 1 wherein said vessel contains several of said multiplicity of vertically stacked bundles of vertical tubes.

10. In an apparatus for single effect vertical tube evaporation of seawater, the improvement comprising:

(a) a multiplicity of vertical stacked bundles of vertical tubes, said tubes being sealed at their ends through an upper tube sheet and a lower tube sheet, (b) means for heating said tube bundles with waste heat or turbine reject steam comprising a common steam conduit interconnecting said multiplicity of vertically stacked bundles of tubes in parallel on their steam-side, (c) brine distribution means interconnecting said multiplicity of stacked bundles of tubes in series on their brine-side, (d) a vapor space separating from one another said multiplicity of vertically stacked bundles of tubes being mounted within a vessel, (e) said vapor space being connected to means for condensing vapor to form distillate, and (f) said vessel having a vertical cylindrical wall, a top cover and a bottom plate, means for circulating seawater brine from said bottom plate to said top cover of said vessel for distribution of said brine through said brine distribution means, and means for evacuation of an from said vessel.

* * * * *